United States Patent
Aten

(10) Patent No.: US 11,840,985 B2
(45) Date of Patent: Dec. 12, 2023

(54) AIRCRAFT PROPULSION SYSTEM WITH VARIABLE AREA INLET

(71) Applicant: Rohr, Inc., Chula Vista, CA (US)

(72) Inventor: Michael Aten, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/471,933

(22) Filed: Sep. 10, 2021

(65) Prior Publication Data

US 2023/0083908 A1 Mar. 16, 2023

(51) Int. Cl.
| F02K 1/12 | (2006.01) |
| B64D 29/06 | (2006.01) |
| B64D 29/08 | (2006.01) |
| B64D 33/02 | (2006.01) |

(52) U.S. Cl.
CPC ............... *F02K 1/12* (2013.01); *B64D 29/06* (2013.01); *B64D 29/08* (2013.01); *B64D 33/02* (2013.01)

(58) Field of Classification Search
CPC .............. B64D 33/02; B64D 2033/026; B64D 2033/0226; B64D 2033/0286; B64D 29/00; B64D 29/06; F02C 7/042; F02C 7/04; F02C 7/045; F02K 1/12
See application file for complete search history.

(56) References Cited

U.S. PATENT DOCUMENTS

| 2,677,232 A | 5/1954 | Collins |
| 2,876,621 A | 3/1959 | Bogert |
| 2,955,414 A | 10/1960 | Hausmann |
| 3,058,693 A | 10/1962 | Doak |
| 3,172,253 A * | 3/1965 | Hughes ..................... F02K 7/16 137/15.1 |
| 3,176,462 A * | 4/1965 | Eckert ....................... F02K 7/16 60/262 |
| 3,199,810 A | 8/1965 | Stroud |
| 3,242,671 A * | 3/1966 | Moorehead ............. F02C 7/042 55/306 |

(Continued)

FOREIGN PATENT DOCUMENTS

| CN | 210637161 U | 5/2020 | |
| CN | 112498710 A * | 3/2021 | ............. B64D 33/02 |

(Continued)

OTHER PUBLICATIONS

EP search report for EP22194968.8 dated May 30, 2023.

*Primary Examiner* — Craig Kim
(74) *Attorney, Agent, or Firm* — GETZ BALICH LLC

(57) ABSTRACT

A propulsion system assembly includes a variable area inlet and an inlet duct. The variable area inlet includes an outer airflow inlet passage, an inner airflow inlet passage, an inlet structure and a center body structure. The outer airflow inlet passage is between the inlet structure and the center body structure. The inner airflow inlet passage is formed within the center body structure. The center body structure includes a valve configured to regulate air flow through the inner airflow inlet passage. The valve includes a first door configured to pivot between a closed position and an open position. The inlet duct is configured to receive air from the outer airflow inlet passage when the first door is in the closed position. The inlet duct is configured to receive air from the outer airflow inlet passage and the inner airflow inlet passage when the first door is in the open position.

20 Claims, 7 Drawing Sheets

(56) References Cited

U.S. PATENT DOCUMENTS

| | | | |
|---|---|---|---|
| 3,495,605 A | 2/1970 | Gunnarson | |
| 3,618,876 A * | 11/1971 | Skidmore | F02C 7/042 137/15.1 |
| 3,664,612 A | 5/1972 | Skidmore | |
| 3,974,648 A | 8/1976 | Kepler | |
| 4,007,891 A * | 2/1977 | Sorensen | B64D 33/02 137/15.1 |
| 4,132,240 A | 1/1979 | Frantz | |
| 4,620,679 A * | 11/1986 | Karanian | B64D 33/02 137/15.1 |
| 4,722,666 A | 2/1988 | Dennison | |
| 5,014,933 A * | 5/1991 | Harm | B64D 33/02 181/220 |
| 5,088,660 A * | 2/1992 | Karanian | F02C 7/042 137/15.2 |
| 5,214,914 A * | 6/1993 | Billig | F23R 3/20 137/15.1 |
| 5,216,878 A * | 6/1993 | Klees | F02K 1/827 60/226.3 |
| 5,881,758 A * | 3/1999 | Koncsek | F02K 7/10 137/15.2 |
| 6,276,632 B1 * | 8/2001 | Sanders | F02C 7/042 244/53 B |
| 6,793,175 B1 | 9/2004 | Sanders | |
| 7,837,142 B2 | 11/2010 | Chase | |
| 8,181,905 B2 | 5/2012 | McDonough | |
| 8,690,097 B1 | 4/2014 | Huynh | |
| 9,908,633 B2 | 3/2018 | Huynh | |
| 10,107,196 B2 | 10/2018 | Devine | |
| 10,221,764 B2 | 3/2019 | Labrecque | |
| 10,308,368 B2 | 6/2019 | Pastouchenko | |
| 2006/0064960 A1 * | 3/2006 | Johnson | F02C 7/042 60/226.3 |
| 2012/0292440 A1 | 11/2012 | Kosheleff | |
| 2017/0321633 A1 | 11/2017 | Boileau | |
| 2018/0371996 A1 | 12/2018 | Hoisington | |

FOREIGN PATENT DOCUMENTS

| | | |
|---|---|---|
| FR | 1066135 A | 6/1954 |
| WO | 2009115674 A2 | 9/2009 |

* cited by examiner

AIRCRAFT PROPULSION SYSTEM WITH VARIABLE AREA INLET

BACKGROUND

1. Technical Field

This disclosure relates generally to an aircraft propulsion system and, more particularly, to an inlet for the aircraft propulsion system with a variable airflow inlet area.

2. Background Information

An aircraft propulsion system may include an inlet structure and a gas turbine engine. The inlet structure directs air into the gas turbine engine. Some known inlet structures include a variable airflow inlet area for tailoring a mass flow of the air entering the gas turbine engine. While these known inlet structures have various advantages, there is still room in the art for improvement. There is a need in the art therefore for an improved inlet assembly with a variable airflow inlet area.

SUMMARY OF THE DISCLOSURE

According to an aspect of the present disclosure, an assembly is provided for an aircraft propulsion system. This aircraft propulsion system assembly includes a variable area inlet and an inlet duct. The variable area inlet includes an outer airflow inlet passage, an inner airflow inlet passage, an inlet structure and a center body structure. The outer airflow inlet passage is radially between the inlet structure and the center body structure. The inner airflow inlet passage is formed within the center body structure. The center body structure includes a valve configured to regulate air flow through the inner airflow inlet passage. The valve includes a first door configured to pivot between a closed position and an open position. The inlet duct is configured to receive air from the outer airflow inlet passage when the first door is in the closed position. The inlet duct is configured to receive air from the outer airflow inlet passage and the inner airflow inlet passage when the first door is in the open position.

According to another aspect of the present disclosure, another assembly is provided for an aircraft propulsion system. This aircraft propulsion system assembly includes a variable area inlet. This variable area inlet includes an outer airflow inlet passage, an inner airflow inlet passage, an inlet structure and a center body structure. The outer airflow inlet passage is radially between the inlet structure and the center body structure. The inner airflow inlet passage is formed within the center body structure. The center body structure is configured as or otherwise includes a valve. The valve includes a plurality of doors. Each of the doors is configured to hinge between a closed position and an open position. The valve is configured to close an opening to the inner airflow inlet passage when each of the doors is in the closed position. The valve is configured to open the opening to the inner airflow inlet passage when each of the doors is in the open position.

According to still another aspect of the present disclosure, another assembly is provided for an aircraft propulsion system. This aircraft propulsion system assembly includes a variable area inlet. This variable area inlet includes an annular outer airflow inlet passage, an annular inner airflow inlet passage, an inlet structure and a center body structure. The annular outer airflow inlet passage is radially between the inlet structure and the center body structure. The annular inner airflow inlet passage is formed within the center body structure. The center body structure is configured as or otherwise includes a valve. The valve includes a plurality of doors. Each of the doors is configured to pivot between a first position and a second position. The valve is configured to regulate airflow through the annular inner airflow inlet passage by pivoting the doors.

The valve may also include a track, an actuator, a slider and a plurality of linkages. The track may be configured with a fixed component of the center body structure. The actuator may be attached to the slider. The slider may be mated with and may be configured to translate along the track. Each of the linkages may be between and may be pivotably connected to the slider and a respective one of the doors.

The assembly may also include an inlet duct configured to receive air from the outer airflow inlet passage when each of the doors is in the closed position. The inlet duct may be configured to receive air from the outer airflow inlet passage and the inner airflow inlet passage when each of the doors is in the open position.

The inner airflow inlet passage may be configured as or otherwise include an annular passage.

The outer airflow inlet passage may circumscribe the inner airflow inlet passage.

The inner airflow inlet passage may extend within the center body structure from an inlet into the center body structure to an outlet from the center body structure.

The inlet may be axially forward of the outer airflow inlet passage.

The first door may be located at the inlet.

The first door may be located at the outlet.

The first door may be connected to another component of the center body structure by a hinge.

The first door may be configured to pivot about a pivot axis between the closed position and the open position. The pivot axis may be perpendicular to a centerline of the variable area inlet.

The first door may be configured to pivot in a radially inward direction towards a centerline of the variable area inlet from the closed position to the open position.

The valve may also include a second door. The first door may be circumferentially next to the second door when the first door and the second door are closed. The first door may circumferentially overlap the second door when the first door and the second door are open.

The valve may also include a second door and an actuator. The actuator may be configured to concurrently pivot the first door and the second door.

The valve may also include a track, an actuator, a slider and a first linkage. The track may be configured with a fixed component of the center body structure. The actuator may be attached to the slider. The slider may be mated with and may be configured to translate along the track. The first linkage may be between and may be pivotably connected to the slider and the first door.

The valve may also include a second door and a second linkage. The second door may be configured to pivot between a closed position and an open position. The second linkage may be between and may be pivotably connected to the slider and the second door.

The inlet duct may be configured to direct air received from the outer airflow inlet passage and the inner airflow inlet passage into a core flowpath of the aircraft propulsion system when the first door is in the open position.

The inlet duct may be configured to direct air received from the outer airflow inlet passage and the inner airflow inlet passage into a bypass flowpath of the aircraft propulsion system when the first door is in the open position.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
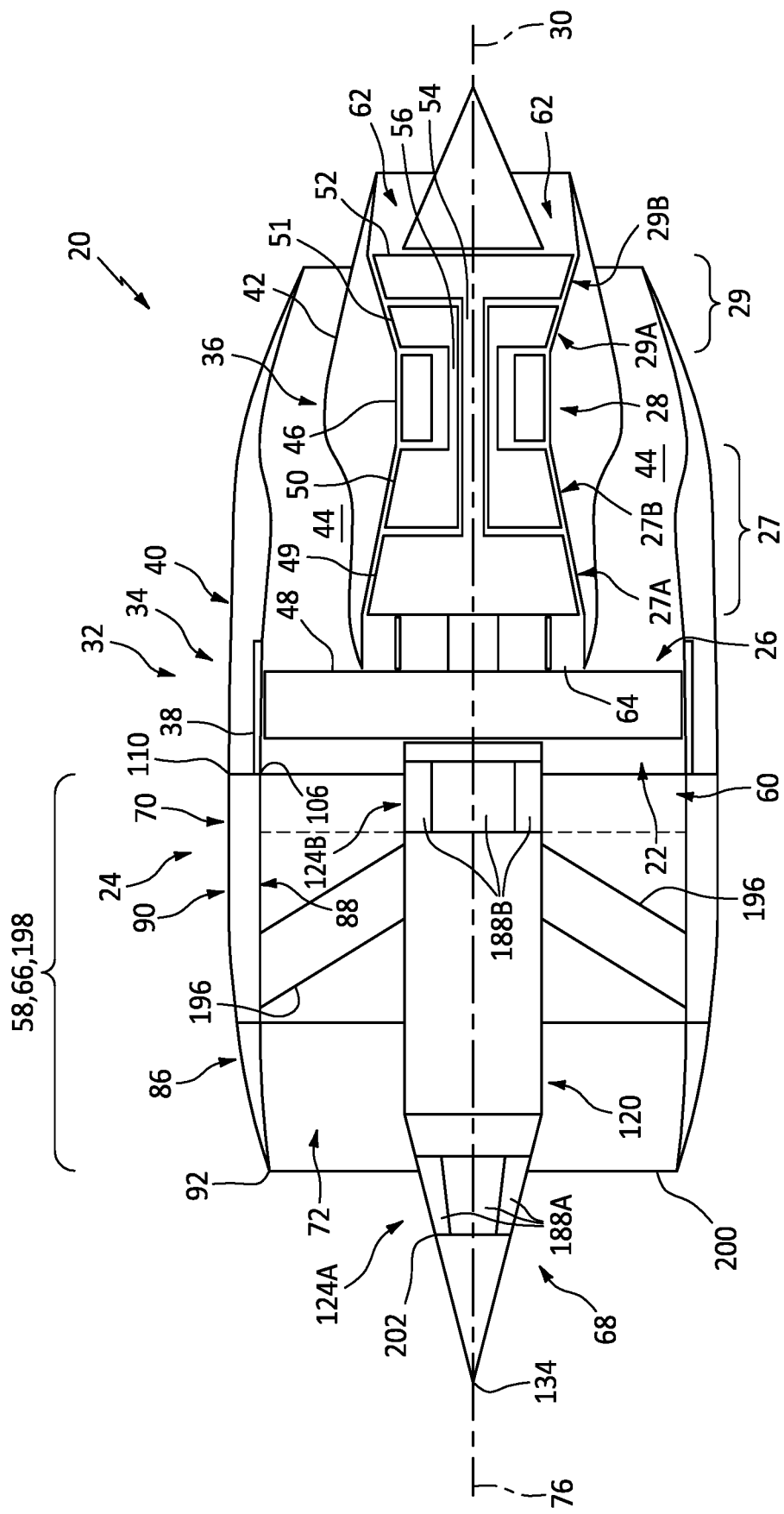
FIG. 1 is a schematic side sectional illustration of an aircraft propulsion system with a variable area inlet in a closed position.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine, or a turbojet engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The combustor section 28 includes a combustor. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This propulsion system housing 32 includes an outer housing structure 34 and an inner housing structure 36.

The outer housing structure 34 includes an outer case 38 (e.g., a fan case) and an outer structure 40 of the nacelle 24; e.g., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; e.g., an inner nacelle structure, which may also be referred to as an inner fixed structure (IFS). More particularly, the outer nacelle structure 40 axially overlaps and extends circumferentially about (e.g., completely around) the inner nacelle structure 42. The outer nacelle structure 40 and the inner nacelle structure 42 thereby at least partially or completely form an annular bypass flowpath 44 within the aircraft propulsion system 20.

The inner housing structure 36 includes an inner case 46 (e.g., a core case) and the inner nacelle structure 42. The inner case 46 houses one or more of the engine sections 27A-29B, which engine sections 27A-29B may be collectively referred to as an engine core. The inner nacelle structure 42 houses and provides an aerodynamic cover for the inner case 46.

Each of the engine sections 26, 27A, 27B, 29A and 29B includes a bladed rotor 48-52. Each of these bladed rotors 48-52 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 48 and the LPC rotor 49 are connected to and driven by the LPT rotor 52 through a low speed shaft 54. The HPC rotor 50 is connected to and driven by the HPT rotor 51 through a high speed shaft 56. The shafts 54 and 56 are rotatably supported by a plurality of bearings (not shown). Each of these bearings is connected to the aircraft propulsion system housing 32 (e.g., the inner case 46) by at least one stationary structure such as, for example, an annular support strut.

During operation, air enters the aircraft propulsion system 20 through an aircraft propulsion system inlet structure 58. This air is directed through an inlet duct 60 (e.g., a fan duct in the fan section 26) and into an annular core flowpath 62 and the bypass flowpath 44. The core flowpath 62 extends axially along the axial centerline 30 within the aircraft propulsion system 20, through the engine sections 27A-29B, from a core airflow inlet 64 to a core nozzle outlet, where the core flowpath 62 is radially within the inner case 46. The bypass flowpath 44 extends axially along the axial centerline 30 within the aircraft propulsion system 20 to a bypass nozzle outlet, where the bypass flowpath 44 is radially between the outer nacelle structure 40 and the inner nacelle structure 42. The air within the core flowpath 62 may be referred to as "core air". The air within the bypass flowpath 44 may be referred to as "bypass air".

The core air is compressed by the LPC rotor 49 and the HPC rotor 50, and directed into a combustion chamber of the combustor in the combustor section 28. Fuel is injected into the combustion chamber and mixed with the compressed core air to provide a fuel-air mixture. This fuel-air mixture is ignited and combustion products thereof flow through and sequentially cause the HPT rotor 51 and the LPT rotor 52 to rotate. The rotation of the HPT rotor 51 and the LPT rotor 52 respectively drive rotation of the HPC rotor 50 and the LPC rotor 49 and, thus, compression of the air received from the core airflow inlet 64. The rotation of the LPT rotor 52 also drives rotation of the fan rotor 48, which propels bypass air through and out of the bypass flowpath 44. The propulsion of the bypass air may account for a majority of thrust generated by the gas turbine engine 22. The aircraft propulsion system 20 of the present disclosure, however, is not limited to the exemplary gas turbine engine configuration described above.

Optimal mass flow requirements of the air entering the aircraft propulsion system 20 through the aircraft propulsion system inlet structure 58 may change depending upon one or more parameters. These parameters may include, but are not limited to, modes of operation, throttle settings and operating conditions. For example, where the aircraft flies at supersonic speeds, a first mass flow of the air may be directed through the aircraft propulsion system inlet structure 58 into the aircraft propulsion system 20. When the aircraft flies at subsonic speeds, a second mass flow of the air may be directed through the aircraft propulsion system inlet structure 58 into the aircraft propulsion system 20, where the second mass flow is different (e.g., greater) than the first mass flow. In another example, the aircraft propulsion system 20 may utilize a different (e.g., higher) mass flow at higher throttle settings than at lower throttle settings.

Figure 2:
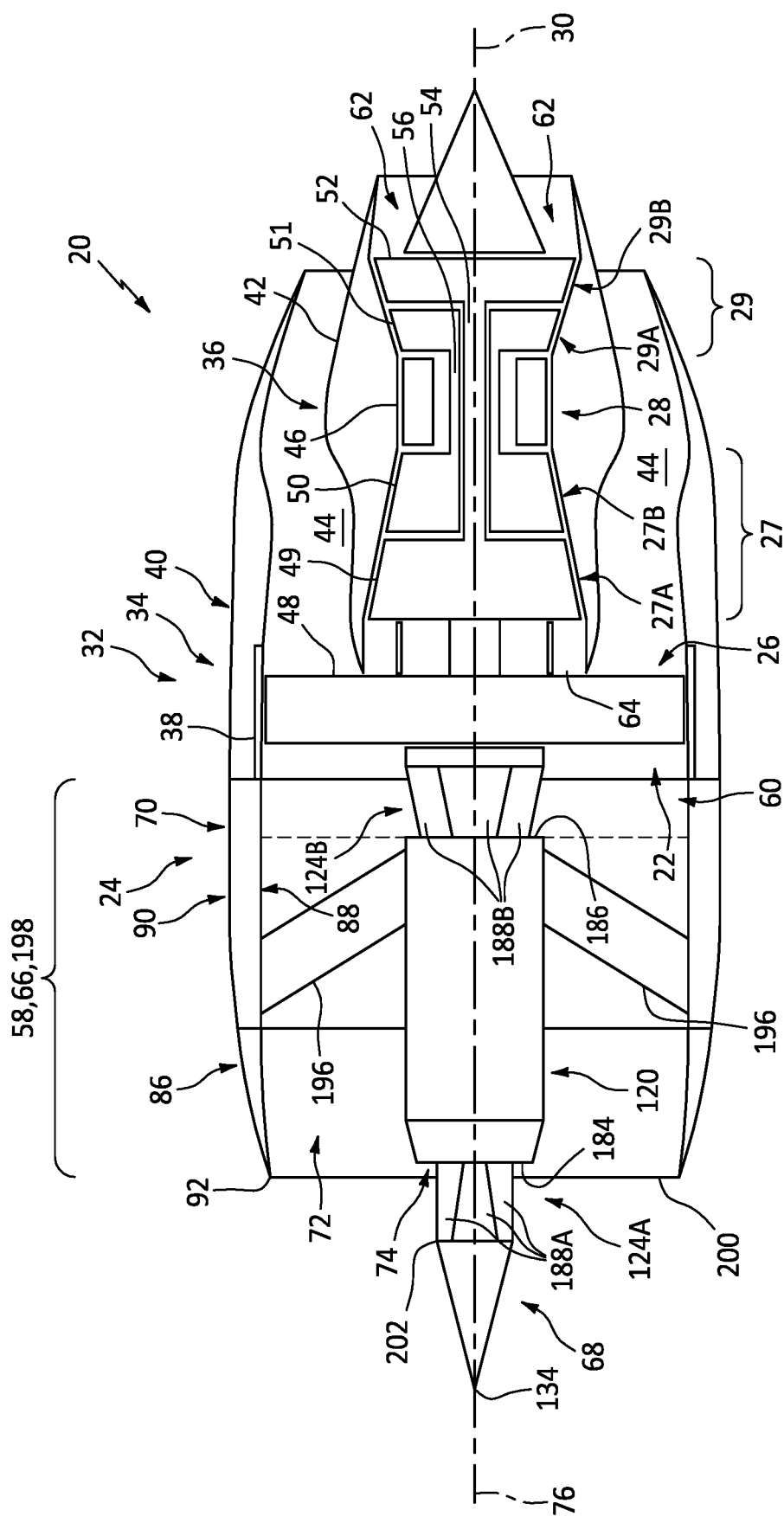
FIG. 2 is a schematic side sectional illustration of the aircraft propulsion system with the variable area inlet in an open position.

To accommodate the changing mass flow requirements for the aircraft propulsion system 20, the aircraft propulsion system inlet structure 58 is configured as a variable area inlet 66. Referring to FIGS. 1 and 2, this variable area inlet 66 includes a center body structure 68 and an inlet structure 70. The inlet structure 70 and the center body structure 68 are configured to provide the variable area inlet 66 with an annular outer airflow inlet passage 72 and an annular inner airflow inlet passage 74 (see FIG. 2). Briefly, the outer airflow inlet passage 72 of FIGS. 1 and 2 is configured as a primary airflow inlet passage, which inlet passage may be a fixed area airflow inlet passage. The inner airflow inlet passage 74 of FIG. 2 is configured as a secondary airflow inlet passage, which inlet passage is a variable area airflow inlet passage.

The inlet structure 70 of FIGS. 1 and 2 is configured to form an outer peripheral boundary of the outer airflow inlet passage 72. The inlet structure 70 of FIGS. 1 and 2 is also configured to form at least a forward portion of an outer peripheral boundary of the inlet duct 60. Briefly, an aft portion of this inlet duct 60 may be formed by the outer case 38. However, in other embodiments, the inlet structure 70 may form an entirety of the inlet duct 60 where, for example, the gas turbine engine 22 is configured as a turbojet engine without the bypass flowpath 44.

Figure 3:
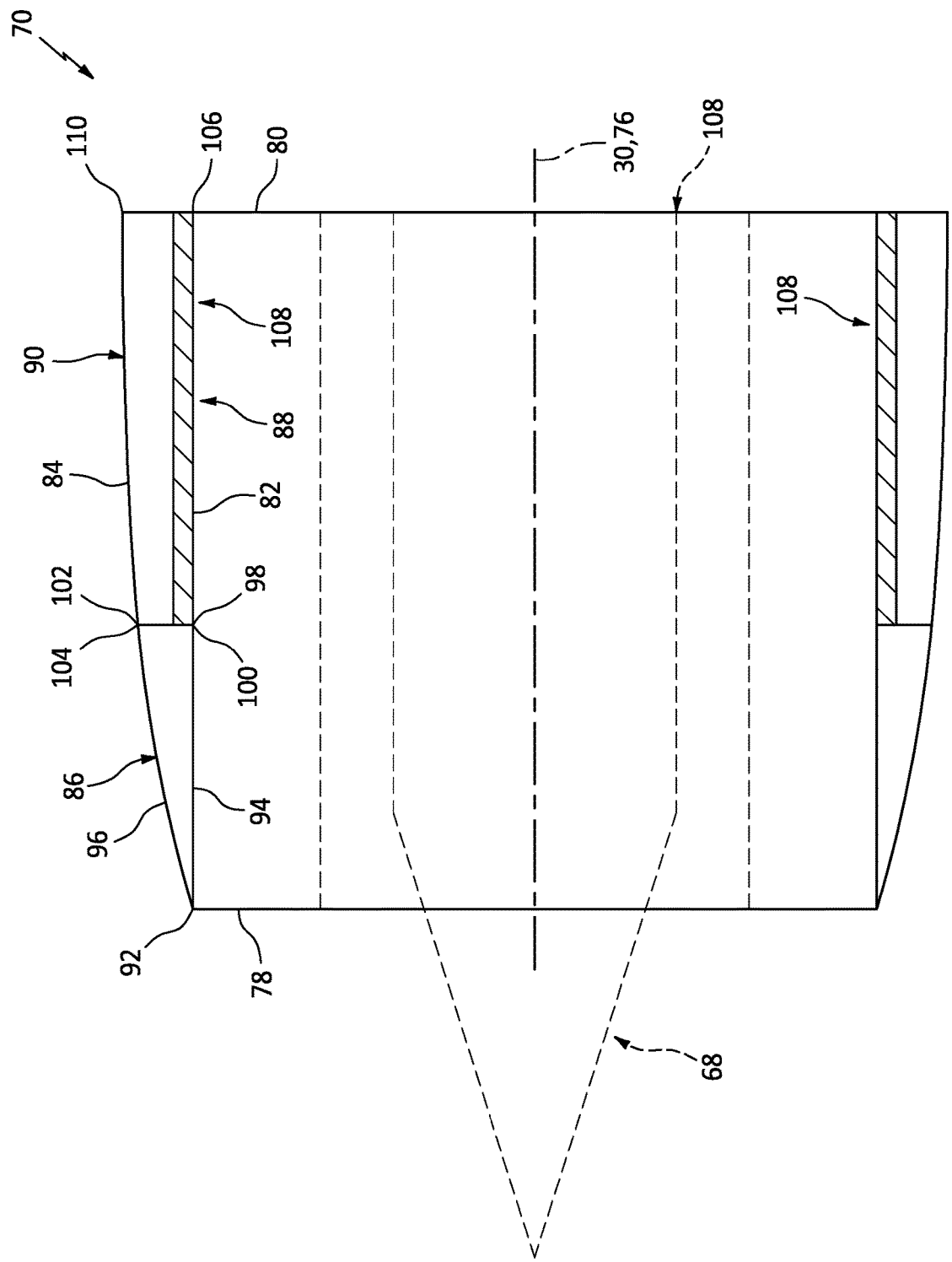
FIG. 3 is a side sectional illustration of an inlet structure.

Referring to FIG. 3, the inlet structure 70 extends axially along an axial centerline 76 (e.g., an axis) of the variable area inlet 66 (see FIGS. 1 and 2) from an upstream, forward end 78 of the inlet structure 70 to a downstream, aft end 80 of the inlet structure 70, which centerline 76 may be coaxial with the axial centerline 30. The inlet structure 70 extends radially from an inner side 82 of the inlet structure 70 to an outer side 84 of the inlet structure 70, which structure inner side 82 forms an internal bore axially along the axial centerline 30, 76 through the inlet structure 70 between and to the structure forward end 78 and the structure aft end 80. The inlet structure 70 extends circumferentially about (e.g., completely around) the axial centerline 30, 76, thereby providing the inlet structure 70 of FIG. 3 with a full-hoop (e.g., tubular) body. The inlet structure 70 of FIG. 3 includes an inlet lip structure 86, an inner barrel 88 and an outer barrel 90.

The inlet lip structure 86 is disposed at the structure forward end 78. The inlet lip structure 86 is configured to form a leading edge 92 of the nacelle 24 (see also FIGS. 1 and 2) as well as an outer peripheral boundary of the outer airflow inlet passage 72. The inlet lip structure 86 of FIG. 3 has a cupped (e.g., a generally V-shafted or U-shaped) side sectional geometry when viewed, for example, in a plane parallel with and/or coincident with the axial centerline 30, 76. The inlet lip structure 86 of FIG. 3, for example, includes axially overlapping inner and outer lip portions 94 and 96. The inner lip portion 94 is connected to and may be integral with the outer lip portion 96 at and along the nacelle leading edge 92. The inner lip portion 94 is disposed at the structure inner side 82. The outer lip portion 96 is disposed at the structure outer side 84. A downstream, aft end 98 of the inner lip portion 94 of FIG. 3 is axially abutted against an upstream, forward end 100 of the inner barrel 88. The inner lip portion 94 may also be connected to the inner barrel 88. A downstream, aft end 102 of the outer lip portion 96 of FIG. 3 is axially abutted against an upstream, forward end 104 of the outer barrel 90. The outer lip portion 96 may also be connected to the outer barrel 90. The inlet lip structure 86 and its lip portions 94 and 96 extend circumferentially about (e.g., completely around) the axial centerline 30, 76.

The inner barrel 88 extends circumferentially about (e.g., completely around) the axial centerline 30, 76. The inner barrel 88 extends axially along the axial centerline 30, 76 from the inner barrel forward end 100 to a downstream, aft end 106 of the inner barrel 88. The inner barrel aft end 106 of FIG. 1 is axially abutted against an upstream, forward end of the outer case 38. The inner barrel 88 may also be connected to the outer case 38.

The inner barrel 88 may be configured to attenuate noise generated during aircraft propulsion system operation and, more particularly for example, noise generated by rotation of the fan rotor 48. The inner barrel 88 of FIG. 3, for example, may include at least one tubular noise attenuating acoustic panel 108 or a circumferential array of arcuate noise attenuating acoustic panels 108 (see dashed lines) arranged around the axial centerline 30, 76. The present disclosure, however, is not limited to such an acoustic inner barrel configuration.

The outer barrel 90 extends circumferentially about (e.g., completely around) the axial centerline 30, 76. The outer barrel 90 extends axially along the axial centerline 30, 76 from the outer barrel forward end 104 to a downstream, aft end 110 of the outer barrel 90. The outer barrel aft end 110 of FIG. 1 is disposed axially next to respective (e.g., upstream, forward) ends of a pair of fan cowls of the outer nacelle structure 40.

Referring to FIGS. 1 and 2, the center body structure 68 is configured to form an inner peripheral boundary of the outer airflow inlet passage 72. The center body structure 68 is configured to form at least a portion or an entirety of an inner peripheral boundary of the inlet duct 60. The center body structure 68 is also configured to form the inner airflow inlet passage 74 therewithin (see FIG. 2).

Figure 4:
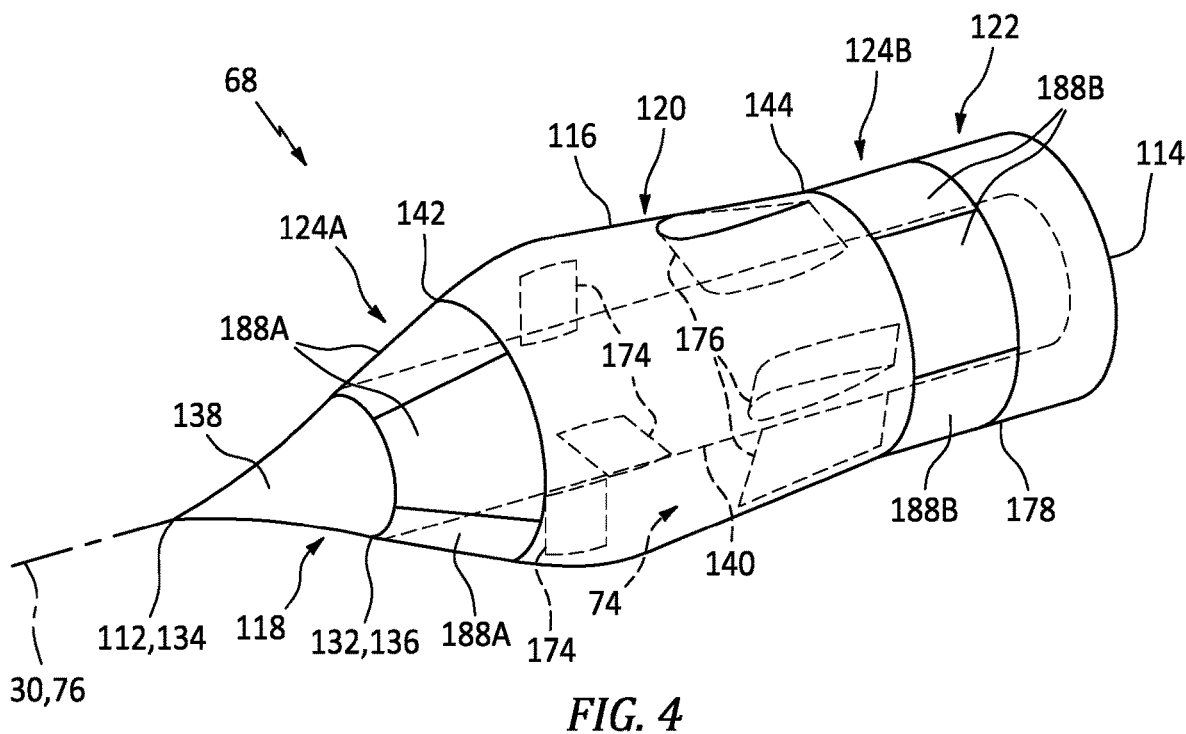
FIG. 4 is a perspective illustration of a center body structure where the variable area inlet is in the closed position.
Figure 5:
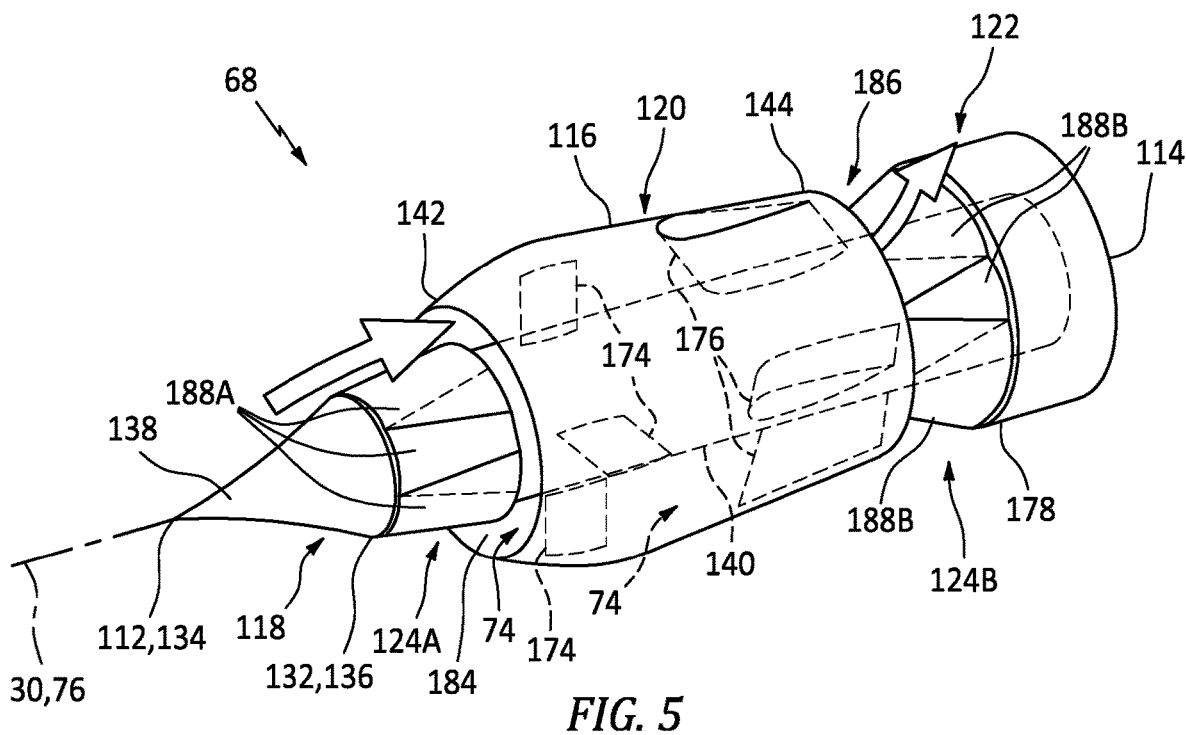
FIG. 5 is a perspective illustration of the center body structure where the variable area inlet is in the open position.

Referring to FIGS. 4 and 5, the center body structure 68 extends axially along the axial centerline 30, 76 from an upstream, forward end 112 of the center body structure 68 to a downstream, aft end 114 of the center body structure 68. The center body structure 68 extends radially outward to an outer side 116 of the center body structure 68, which center body structure outer side 116 extends circumferentially about (e.g., completely around) the axial centerline 30, 76. The center body structure 68 of FIGS. 4 and 5 includes a center body base structure 118 and one or more center body shroud structures 120 and 122. The center body structure 68 of FIGS. 4 and 5 also includes one or more valves 124A and 124B (generally referred to as "124") for regulating airflow through the inner airflow inlet passage 74. In the valve arrangement of FIG. 4, for example, the valves 124 may restrict (e.g., prevent or substantially reduce) airflow through the inner airflow inlet passage 74; e.g., doors 188A and 188B may be closed. In the valve arrangement of FIG. 5, the valves 124 may facilitate (e.g., allow or increase) airflow through the inner airflow inlet passage 74; e.g., doors 188A and 188B may be opened.

Figure 6:
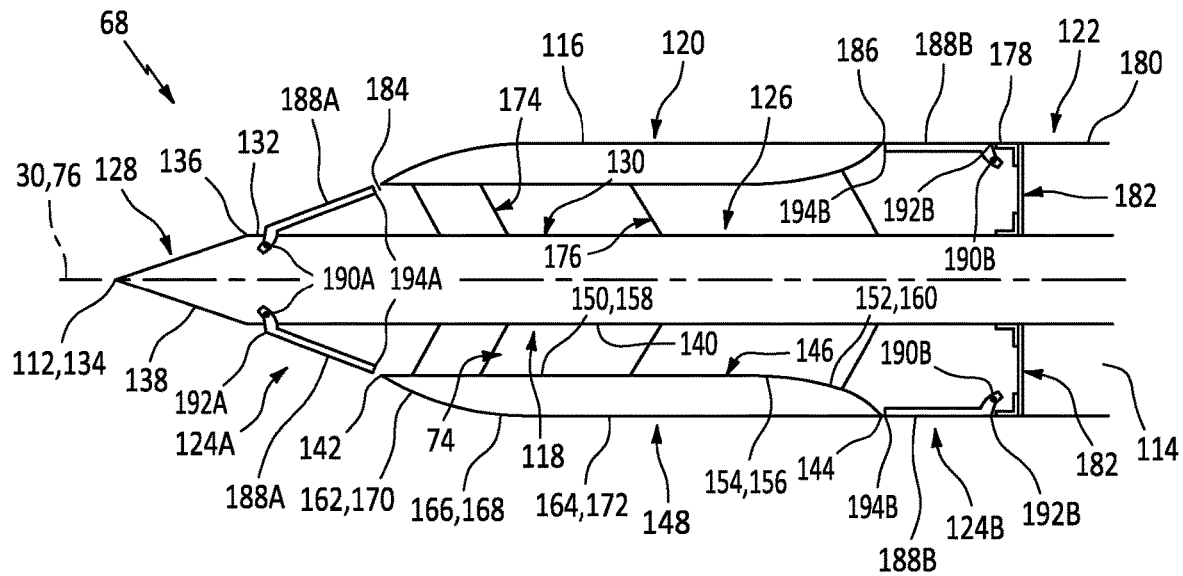
FIG. 6 is a side sectional illustration of the center body structure where the variable area inlet is in the closed position.
Figure 7:
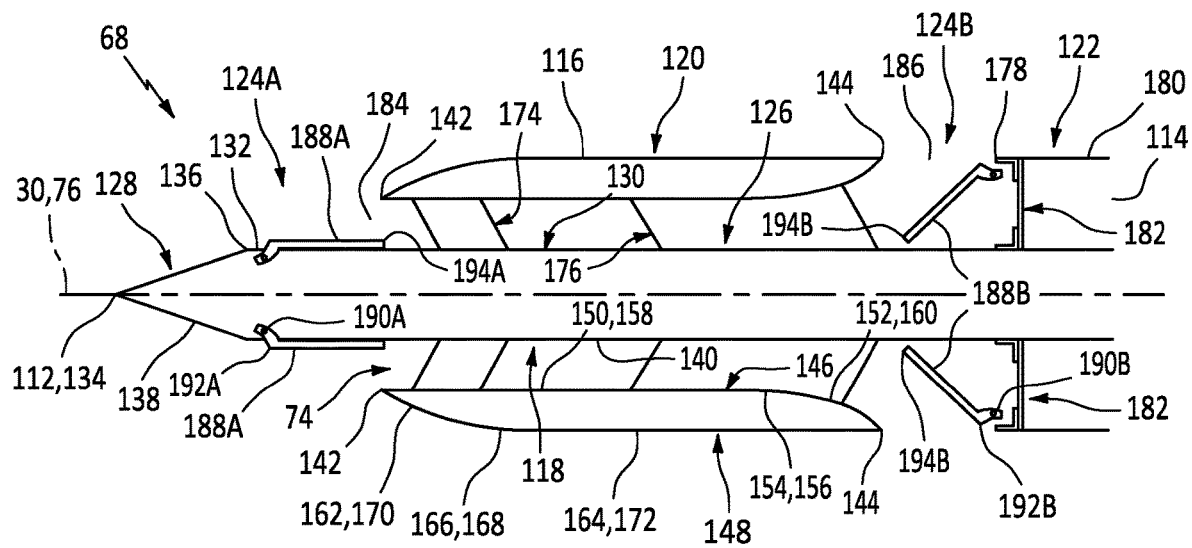
FIG. 7 is a side sectional illustration of the center body structure where the variable area inlet is in the open position.

Referring to FIGS. 6 and 7, the base structure 118 extends axially along the axial centerline 30, 76 from the center body structure forward end 112 to (or about) the center body structure aft end 114. The base structure 118 extends radially outward to an outer side 126 of the base structure 118, which base structure outer side 126 extends circumferentially about (e.g., completely around) the axial centerline 30, 76. The base structure 118 of FIGS. 6 and 7 includes a forward tapered portion 128 and an aft barrel portion 130.

The tapered portion 128 is disposed at the center body structure forward end 112. The tapered portion 128 of FIGS. 6 and 7, for example, projects axially along the axial centerline 30, 76 from a downstream, aft end 132 of the tapered portion 128 to a tip 134 (e.g., a leading end point) of the center body structure 68 at the center body structure forward end 112. The tapered portion aft end 132 of FIGS. 6 and 7 is abutted axially against an upstream, forward end 136 of the barrel portion 130. The tapered portion 128 may also be connected to the barrel portion 130.

The center body structure 68 radially tapers as the tapered portion 128 extends axial along the axial centerline 30, 76 towards the center body structure tip 134. The tapered portion 128 of FIGS. 6 and 7, for example, includes an outer tapered surface 138 (e.g., a conical surface) at the center body structure outer side 116/the base structure outer side 126. This tapered surface 138 extends circumferentially about (e.g., completely around) the axial centerline 30, 76. The tapered surface 138 radially tapers as the tapered portion 128 extends axially along the axial centerline 30, 76 from the barrel portion 130 to the center body structure tip 134. At least a portion or an entirety of the tapered surface 138 may have a straight sectional geometry when viewed, for example, in a plane parallel with and/or coincident with the axial centerline 30, 76. At least a portion or the entirety of the tapered surface 138 may alternatively (or also) have a non-straight sectional geometry such as, but not limited to, a curved sectional geometry, a splined sectional geometry, a concave sectional geometry, a convex sectional geometry, etc.

The barrel portion 130 is disposed at (or about) the center body structure aft end 114. The barrel portion 130 of FIGS. 6 and 7, for example, projects axially along the axial centerline 30, 76 from the barrel portion forward end 136 to (or about) the center body structure aft end 114.

The barrel portion 130 may have a (e.g., cylindrical, concave and/or convex) tubular configuration. The barrel portion 130 of FIGS. 6 and 7, for example, includes a barrel surface 140 with a cylindrical geometry (or a generally cylindrical geometry) at the base structure outer side 126. The barrel surface 140 of FIGS. 6 and 7, for example, extends axially along the axial centerline 30, 76 between and to the barrel portion forward end 136 and the center body structure aft end 114 without, for example, significant (or any) radial displacement. More particularly, a radius from the axial centerline 30, 76 to the barrel surface 140 may remain substantially or completely constant as the barrel surface 140 extends axially along the axial centerline 30, 76. However, in other embodiments, the barrel surface 140 may include one or more non-straight (e.g., concave or convex) sections axially between the barrel portion forward end 136 and the center body structure aft end 114.

The forward shroud structure 120 extends axially along the axial centerline 30, 76 from an upstream, forward end 142 (e.g., an annular leading edge) of the forward shroud structure 120 to a downstream, aft end 144 (e.g., an annular trailing edge) of the forward shroud structure 120. The forward shroud structure 120 extends radially from an inner side 146 of the forward shroud structure 120 to an outer side 148 of the forward shroud structure 120. The forward shroud structure inner side 146 is radially displaced from and extends circumferentially about (e.g., completely around) the base structure outer side 126 and its barrel surface 140. The forward shroud structure outer side 148 extends circumferentially about (e.g., completely around) the forward shroud structure inner side 146.

The forward shroud structure inner side 146 includes an inner barrel portion 150 and an inner tapered portion 152. The inner barrel portion 150 is disposed at (or about) the forward shroud structure forward end 142. The inner barrel portion 150 of FIGS. 6 and 7, for example, projects axially along the axial centerline 30, 76 from the forward shroud structure forward end 142 to an aft end 154 of the inner barrel portion 150. This inner barrel portion aft end 154 is axially abutted against an upstream, forward end 156 of the inner tapered portion 152. The inner barrel portion 150 may also be connected to the inner tapered portion 152.

The inner barrel portion 150 may have a tubular configuration. The inner barrel portion 150 of FIGS. 6 and 7, for example, includes an inner barrel surface 158 with a cylindrical geometry (or a generally cylindrical geometry) at the forward shroud structure inner side 146. The inner barrel surface 158 of FIGS. 6 and 7, for example, extends axially along the axial centerline 30, 76 between and to the forward shroud structure forward end 142 and the inner barrel portion aft end 154 without, for example, significant (or any) radial displacement. More particularly, a radius from the axial centerline 30, 76 to the inner barrel surface 158 may remain substantially or completely constant as the inner barrel surface 158 extends axially along the axial centerline 30, 76. However, in other embodiments, the inner barrel surface 158 may include one or more non-straight (e.g., concave or convex) sections axially between the forward shroud structure forward end 142 and the inner barrel portion aft end 154.

The inner tapered portion 152 is disposed at the forward shroud structure aft end 144. The inner tapered portion 152 of FIGS. 6 and 7, for example, projects axially along the axial centerline 30, 76 from the inner tapered portion forward end 156 to the forward shroud structure aft end 144.

The forward shroud structure inner side 146 radially tapers as the inner tapered portion 152 extends axially along the axial centerline 30, 76 towards the inner barrel portion 150. The inner tapered portion 152 of FIGS. 6 and 7, for example, includes an inner tapered surface 160 (e.g., a frustoconical surface) at the forward shroud structure inner side 146. This inner tapered surface 160 extends circumferentially about (e.g., completely around) the axial centerline 30, 76. The inner tapered surface 160 radially tapers as the inner tapered portion 152 extends axial along the axial centerline 30, 76 from the forward shroud structure aft end 144 to the inner barrel portion 150. At least a portion or an entirety of the inner tapered surface 160 may have a convex (e.g., curved, splined) sectional geometry when viewed, for example, in a plane parallel with and/or coincident with the axial centerline 30, 76. At least a portion or the entirety of the inner tapered surface 160 may alternatively (or also) have a straight sectional geometry.

The forward shroud structure outer side 148 includes an outer tapered portion 162 and an outer barrel portion 164. The outer tapered portion 162 is disposed at the forward shroud structure forward end 142. The outer tapered portion 162 of FIGS. 6 and 7, for example, projects axially along the axial centerline 30, 76 from a downstream, aft end 166 of the outer tapered portion 162 to the forward shroud structure forward end 142. The outer tapered portion aft end 166 is axially abutted against an upstream, forward end 168 of the outer barrel portion 164. The outer tapered portion 162 may also be connected to the outer barrel portion 164.

The forward shroud structure outer side 148 radially tapers as the outer tapered portion 162 extends axially along the axial centerline 30, 76 towards the forward shroud structure forward end 142. The outer tapered portion 162 of FIGS. 6 and 7, for example, includes an outer tapered surface 170 (e.g., a frustoconical surface) at the forward shroud structure outer side 148. This outer tapered surface 170 extends circumferentially about (e.g., completely around) the axial centerline 30, 76. The outer tapered surface 170 radially tapers as the outer tapered portion 162 extends axial along the axial centerline 30, 76 from the outer barrel portion 164 to the forward shroud structure forward end 142. At least a portion or an entirety of the outer tapered surface 170 may have a convex (e.g., curved, splined) sectional geometry when viewed, for example, in a plane parallel with and/or coincident with the axial centerline 30, 76. At least a portion or the entirety of the outer tapered surface 170 may alternatively (or also) have a straight sectional geometry.

The outer barrel portion 164 is disposed at (or about) the forward shroud structure aft end 144. The outer barrel portion 164 of FIGS. 6 and 7, for example, projects axially along the axial centerline 30, 76 from the outer barrel portion forward end 168 to the forward shroud structure aft end 144.

The outer barrel portion 164 may have a tubular configuration. The outer barrel portion 164 of FIGS. 6 and 7, for example, includes an outer barrel surface 172 with a cylindrical geometry (or a generally cylindrical geometry) at the forward shroud structure outer side 148. The outer barrel surface 172 of FIGS. 6 and 7, for example, extends axially along the axial centerline 30, 76 between and to the forward shroud structure aft end 144 and the outer barrel portion forward end 168 without, for example, significant (or any) radial displacement. More particularly, a radius from the axial centerline 30, 76 to the outer barrel surface 172 may remain substantially or completely constant as the outer barrel surface 172 extends axially along the axial centerline 30, 76. However, in other embodiments, the outer barrel surface 172 may include one or more non-straight (e.g., concave or convex) sections axially between the forward shroud structure aft end 144 and the outer barrel portion forward end 168.

The forward shroud structure 120 may be connected to the base structure 118 by one or more struts 174 and 176. Each of these struts 174, 176 is connected to and extends radially between the base structure 118 and the forward shroud structure 120. The forward struts 174 may be arranged is an array about the axial centerline 30, 76, axially proximate the forward shroud structure forward end 142. The aft struts 176 may be arranged is an array about the axial centerline 30, 76, axially proximate the forward shroud structure aft end 144. In some embodiments, one or more of the struts 174 and/or 176 may extend further to the outer barrel 90 in FIGS. 1 and 2.

The aft shroud structure 122 extends axially along the axial centerline 30, 76 from an upstream, forward end 178 (e.g., an annular leading edge) of the aft shroud structure 122 to (or about) the center body structure aft end 114. The aft shroud structure 122 projects radially to an outer side 180 of the aft shroud structure 122.

The aft shroud structure 122 extends circumferentially about (e.g., completely around) the base structure 118. The aft shroud structure 122 is radially displaced from the base structure 118 and its outer side 130. The aft shroud structure 122 is connected to the base structure 118 by a support structure 182 such as, but not limited to, an annular bulkhead. This support structure 182 may extend circumferentially about (e.g., completely) around the base structure 118 and the axial centerline 30, 76. The support structure 182 of FIGS. 6 and 7 is located axially proximate the aft shroud structure forward end 178.

Referring to FIG. 7, with the forgoing center body structure arrangement, the inner airflow inlet passage 74 extends axially within the center body structure 68 between and to an annular inlet 184 of the inner airflow inlet passage 74 and an annular outlet 186 of the inner airflow inlet passage 74. The inner airflow inlet passage 74 is formed by and extends radially between the base structure outer side 126 and the forward shroud structure inner side 146. The inner airflow inlet passage 74 extends circumferentially about (e.g., completely around) the axial centerline 30, 76 as well as the base structure 118.

The inner passage inlet 184 of FIG. 7 is formed by an annular opening (e.g., port) into the center body structure outer side 116. This inner passage inlet 184 extends longitudinally (e.g., axially and radially) between and to (or about) the tapered portion aft end 132 and the forward shroud structure forward end 142. The inner passage inlet 184 extends circumferentially about (e.g., completely around) the axial centerline 30, 76.

The inner passage outlet 186 of FIG. 7 is formed by an annular outlet opening (e.g., port) into the center body structure outer side 116. This inner passage outlet 186 extends longitudinally (e.g., axially) between and to (or about) the forward shroud structure aft end 144 and the aft shroud structure forward end 178. The inner passage outlet 186 extends circumferentially about (e.g., completely around) the axial centerline 30, 76.

The forward valve 124A (e.g., an inlet valve) is configured to regulate airflow into the inner passage inlet 184. The forward valve 124A of FIGS. 6 and 7, for example, is arranged at (e.g., on, adjacent or proximate) the inner passage inlet 184. This forward valve 124A includes one or more forward doors 188A. These forward doors 188A are arranged circumferentially about the axial centerline 30, 76 in an annular array. Each of the forward doors 188A is pivotally connected to the base structure 118. Each forward door 188A of FIG. 6, for example, is connected to the base structure 118 by at least one respective a hinge 190A (or multiple hinges) at a forward and/or inner end 192A of the respective forward door 188A. Each forward door 188A may thereby pivot (e.g., hinge) about a respective pivot axis of the hinge 190A between a closed position (see FIG. 6) and an open position (see FIG. 7), where the pivot axis may be arranged perpendicular to and radially displaced from the axial centerline 30, 76.

In the closed position of FIG. 6, an aft and/or outer end 194A of each forward door 188A is located at the forward shroud structure forward end 142. The closed forward doors 188A may thereby bridge a gap between the base structure 118 and the forward shroud structure 120 along the center body structure outer side 116. Referring to FIG. 4, each of the forward doors 188A extends laterally (e.g., circumferentially) between opposing lateral sides of the respective forward door 188A. Each forward door lateral side may be abutted laterally next to the forward door lateral side of a circumferentially adjacent one of the forward doors 188A. The forward doors 188A may thereby cover/close off the inner passage inlet 184 (see FIG. 5) when the forward doors 188A are in their closed positions. An inner pressure seal may be included between the forward doors 188A and the base structure 118 to seal an interface therebetween. An outer pressure seal may also or alternatively be included between the forward doors 188A and the forward shroud structure 120 to seal an interface therebetween.

In the open position of FIG. 7, the aft and/or outer end 194A of each forward door 188A is located along (or towards) the base structure outer side 126. The aft and/or outer end 194A of each forward door 188A may thereby be radially displaced radially inward from the forward shroud structure forward end 142. Referring to FIG. 5, each forward door 188A may laterally overlap a circumferentially adjacent one of the forward doors 188A. The forward doors 188A may thereby uncover/open up the inner passage inlet 184 when the forward doors 188A are in their open positions.

Referring to FIGS. 6 and 7, the aft valve 124B (e.g., outlet valve) is configured to regulate airflow out of the inner passage outlet 186. The aft valve 124B of FIGS. 6 and 7, for example, is arranged at (e.g., on, adjacent or proximate) the inner passage outlet 186. This aft valve 124B includes one or more aft doors 188B. These aft doors 188B are arranged circumferentially about the axial centerline 30, 76 in an annular array. Each of the aft doors 188B is pivotally connected to the support structure 182 (or the aft shroud structure 122). Each aft door 188B of FIG. 6, for example, is connected to the support structure 182 (or the aft shroud structure 122) by a respective hinge 190B at an aft and/or outer end 192B of the respective aft door 188B. Each aft door 188B may thereby pivot (e.g., hinge) about a respective pivot axis of the hinge 190B between a closed position (see FIG. 6) and an open position (see FIG. 7), where the pivot axis may be arranged perpendicular to and radially displaced from the axial centerline 30, 76.

In the closed position of FIG. 6, a forward and/or inner end 194B of each aft door 188B is located at the forward shroud structure aft end 144. The closed aft doors 188B may thereby bridge a gap between the forward shroud structure 120 and the aft shroud structure 122 along the center body structure outer side 116. Referring to FIG. 4, each of the aft doors 188B extends laterally (e.g., circumferentially) between opposing lateral sides of the respective aft door 188B. Each aft door lateral side may be abutted laterally next to the aft door lateral side of a circumferentially adjacent one of the aft doors 188B. The aft doors 188B may thereby cover/close off the inner passage outlet 186 (see FIG. 5) when the aft doors 188B are in their closed positions. A forward pressure seal may be included between the aft doors 188B and the forward shroud structure 120 to seal an interface therebetween. An aft pressure seal may also or alternatively be included between the aft doors 188B and the aft shroud structure 122 to seal an interface therebetween.

In the open position of FIG. 7, the forward and/or inner end 194B of each aft door 188B is located along (or towards) the base structure outer side 126. The forward and/or inner end 194B of each aft door 188B may thereby be radially displaced radially inward from the forward shroud structure aft end 144. Referring to FIG. 5, each aft door 188B may laterally overlap a circumferentially adjacent one of the aft doors 188B. The aft doors 188B may thereby uncover/open up the inner passage outlet 186 when the aft doors 188B are in their open positions.

Referring to FIGS. 1 and 2, the center body structure 68 is fixedly connected to the inlet structure 70. The center body structure 68 of FIGS. 1 and 2, for example, is structurally tied to the inlet structure 70 by one or more struts 196. These struts 196 are arranged circumferentially about the centerline 30, 76 in an array. Each of the struts 196 of FIGS. 1 and 2 extends radially between and is connected to the forward shroud structure 120 and the inner barrel 88.

With the foregoing configuration of FIGS. 1 and 2, the variable area inlet elements 68 and 70 are configured as a flow regulator 198. This flow regulator 198 is configured to regulate the flow of air through at least the inner airflow inlet passage 74 to the inlet duct 60. For example, in the closed arrangement of FIG. 1 (see also FIGS. 4 and 6), the flow regulator 198 is configured to (e.g., fully, completely) close the inner airflow inlet passage 74 (see FIG. 2). The flow regulator 198 may thereby fluidly decouple the inner airflow inlet passage 74 from the inlet duct 60. However, in the open arrangement of FIG. 2 (see also FIGS. 5 and 7), the flow regulator 198 is configured to (e.g., fully, completely) open the inner airflow inlet passage 74. The flow regulator 198 may thereby fluidly couple the inner airflow inlet passage 74 with the inlet duct 60.

While the forward doors 188A and the aft doors 188B of FIGS. 4-7 are described above as moving (e.g., pivoting, hinging) between their closed positions (see FIGS. 4 and 6) and their open positions (see FIGS. 5 and 7), it is contemplated the forward doors 188A and/or the aft doors 188B may also move to one or more intermediate positions therebetween in order to variably modulate/regulate the flow of air through the inner airflow inlet passage 74 to the inlet duct 60.

In some embodiments, referring to FIG. 2, the inner passage inlet 184 may be located axially forward of an inlet 200 to the outer airflow inlet passage 72. A forward end 202 of the inner passage inlet 184 of FIGS. 1 and 2, for example, is axially displaced forward of the outer passage inlet 200. However, the inner passage inlet 184 may also axially overlap the outer passage inlet 200. Alternatively, the inner passage inlet 184 may be positioned completely axially forward of the outer passage inlet 200, or completely axially aft of the outer passage inlet 200.

Figure 8:
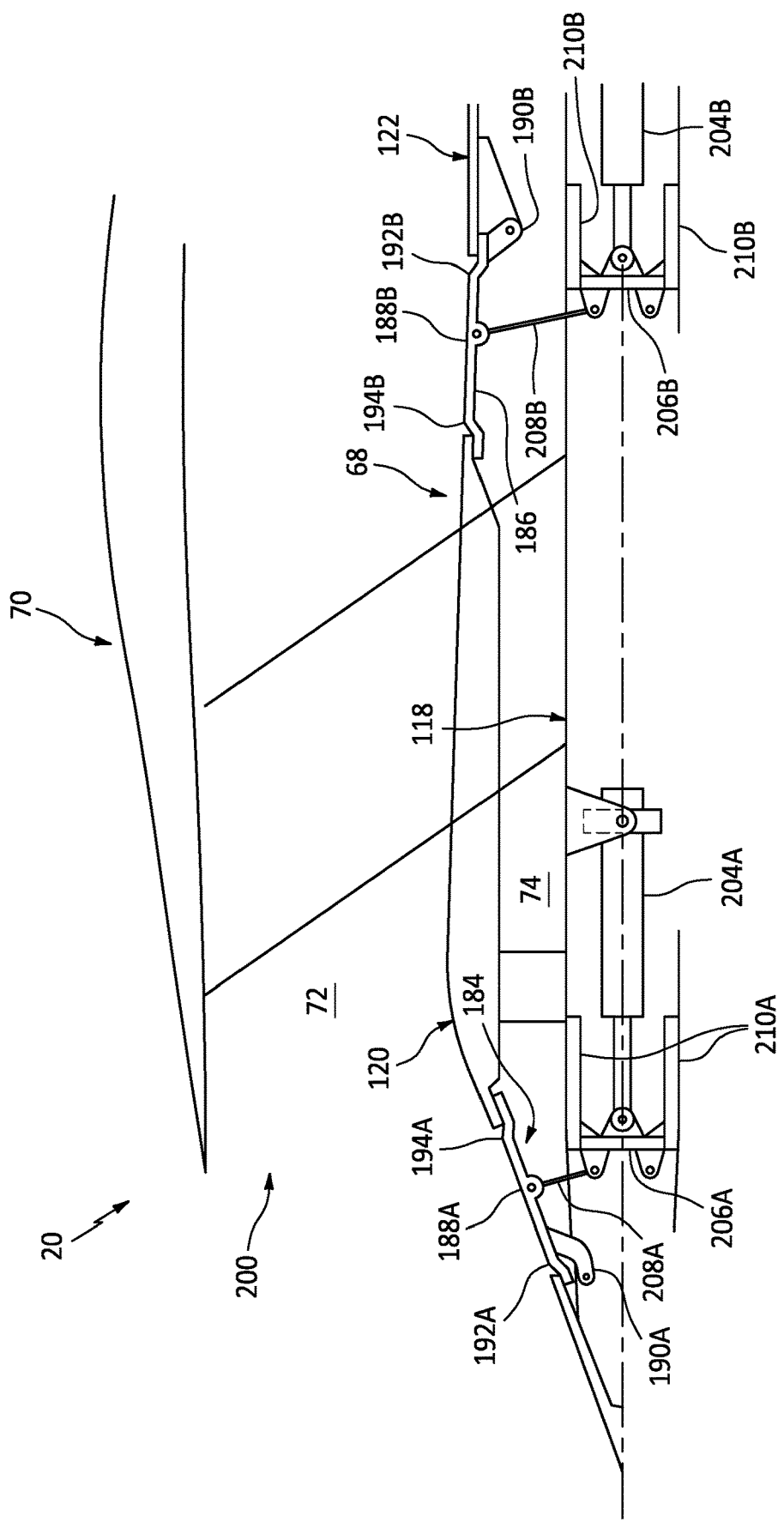
FIG. 8 is a side sectional illustration of a portion of the variable area inlet.
Figure 9:
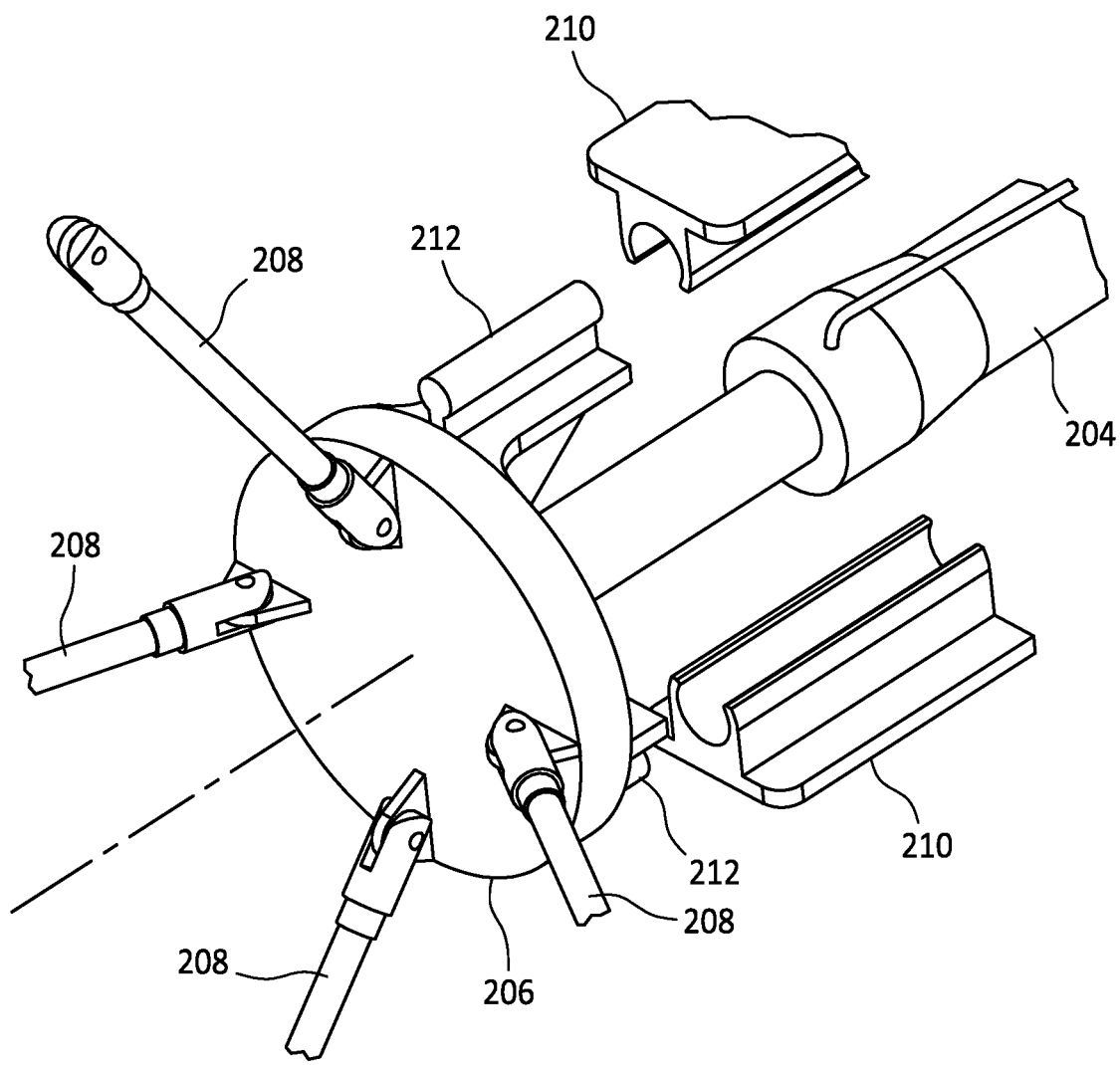
FIG. 9 is a perspective illustration of a portion of an actuator assembly for the variable area inlet.

In some embodiments, referring to FIGS. 8 and 9, each of the valves 124 may include an actuator 204A, 204B (generally referred to as "204") to move (e.g., pivot) the respective doors 188A, 188B. This actuator 204 may be configured as a linear actuator such as, but not limited to, a hydraulic cylinder. The actuator 204 is connected to the base structure 118, for example, by a pin connection. The actuator 204 is connected one or more or all of the respective doors 188 via a coupling assembly. This coupling assembly includes a slider 206A, 206B (generally referred to as "206") (e.g., a carriage) and one or more linkages 208A, 208B (generally referred to as "208") (e.g., tie rods, fixed length arms, variable length arms, etc.). The slider 206A, 206B is mated with one or more tracks 210A, 210B (generally referred to as "210"). More particularly, referring to FIG. 9, one or more lugs 212 on each slider 206 are respectively inserted into channels in the tracks 210. The slider 206 is thereby configured to move (e.g., translate, slide, etc.) along the tracks 210. Referring to FIG. 8, the actuator 204 is connected to the slider 206, for example, by a pin connection. Each of the linkages 208 is between the slider 206 and a respective one of the doors 188. Each linkage 208 of FIG. 8 is pivotally connected to the slider 206 and a respective one of the doors 188, for example, by a pin connection. With this arrangement, each actuator 204A, 204B may move the respective set of doors 188A, 188B concurrently; e.g., simultaneously. The actuators 204 may also be timed to open and close the inner passage inlet 184 and the inner passage outlet 186 concurrently; e.g., simultaneously. The present disclosure, however, is not limited to such an exemplary arrangement.

The aircraft propulsion system 20 and its variable area inlet 66 may be configured with various gas turbine engines other than the one described above. The gas turbine engine, for example, may be configured as a geared or a direct drive turbine engine. The gas turbine engine may be configured with a single spool, with two spools (e.g., see FIG. 1), or with more than two spools. The gas turbine engine may be configured as a turbofan engine, a turbojet engine or any other type of turbine engine. The present invention therefore is not limited to any particular types or configurations of gas turbine engines. The present disclosure is also not limited to applications where the aircraft is capable of traveling supersonic speeds.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a variable area inlet comprising an outer airflow inlet passage, an inner airflow inlet passage, an inlet structure and a center body structure, the outer airflow inlet passage radially between the inlet structure and the center body structure, the inner airflow inlet passage formed within the center body structure, the center body structure comprising a valve configured to regulate air flow through the inner airflow inlet passage, and the valve comprising a first door configured to pivot between a closed position and an open position; and
   an inlet duct configured to receive air from the outer airflow inlet passage when the first door is in the closed position, and the inlet duct configured to receive air from the outer airflow inlet passage and the inner airflow inlet passage when the first door is in the open position;
   wherein the inlet duct is configured to direct air received from the outer airflow inlet passage and the inner airflow inlet passage into a core flowpath of the aircraft propulsion system when the first door is in the open position.

2. The assembly of claim 1, wherein the inner airflow inlet passage comprises an annular passage.

3. The assembly of claim 1, wherein the outer airflow inlet passage circumscribes the inner airflow inlet passage.

4. The assembly of claim 1, wherein the inner airflow inlet passage extends within the center body structure from an inlet into the center body structure to an outlet from the center body structure.

5. The assembly of claim 4, wherein the inlet is axially forward of the outer airflow inlet passage.

6. The assembly of claim 4, wherein the first door is located at the inlet.

7. The assembly of claim 4, wherein the first door is located at the outlet.

8. The assembly of claim 1, wherein the first door is connected to another component of the center body structure by a hinge.

9. The assembly of claim 1, wherein
   the first door is configured to pivot about a pivot axis between the closed position and the open position; and
   the pivot axis is perpendicular to a centerline of the variable area inlet.

10. The assembly of claim 1, wherein the first door is configured to pivot in a radially inward direction towards a centerline of the variable area inlet from the closed position to the open position.

11. An assembly for an aircraft propulsion system, comprising:
    a variable area inlet comprising an outer airflow inlet passage, an inner airflow inlet passage, an inlet structure and a center body structure, the outer airflow inlet passage radially between the inlet structure and the center body structure, the inner airflow inlet passage formed within the center body structure, the center body structure comprising a valve configured to regulate air flow through the inner airflow inlet passage, and the valve comprising a first door configured to pivot between a closed position and an open position; and
    an inlet duct configured to receive air from the outer airflow inlet passage when the first door is in the closed position, and the inlet duct configured to receive air from the outer airflow inlet passage and the inner airflow inlet passage when the first door is in the open position;
    wherein the valve further comprises a second door;
    wherein the first door is circumferentially next to the second door when the first door and the second door are closed; and
    wherein the first door circumferentially overlaps the second door when the first door and the second door are open.

12. An assembly for an aircraft propulsion system, comprising:
    a variable area inlet comprising an outer airflow inlet passage, an inner airflow inlet passage, an inlet structure and a center body structure, the outer airflow inlet passage radially between the inlet structure and the center body structure, the inner airflow inlet passage formed within the center body structure, the center body structure comprising a valve configured to regulate air flow through the inner airflow inlet passage, and the valve comprising a first door configured to pivot between a closed position and an open position; and
    an inlet duct configured to receive air from the outer airflow inlet passage when the first door is in the closed position, and the inlet duct configured to receive air from the outer airflow inlet passage and the inner airflow inlet passage when the first door is in the open position;
    wherein the valve further comprises a second door and an actuator; and
    wherein the actuator is configured to concurrently pivot the first door and the second door.

13. An assembly for an aircraft propulsion system, comprising:
    a variable area inlet comprising an outer airflow inlet passage, an inner airflow inlet passage, an inlet structure and a center body structure, the outer airflow inlet passage radially between the inlet structure and the center body structure, the inner airflow inlet passage formed within the center body structure, the center body structure comprising a valve configured to regulate air flow through the inner airflow inlet passage, and the valve comprising a first door configured to pivot between a closed position and an open position; and
    an inlet duct configured to receive air from the outer airflow inlet passage when the first door is in the closed position, and the inlet duct configured to receive air from the outer airflow inlet passage and the inner airflow inlet passage when the first door is in the open position;

wherein the valve further comprises a track, an actuator, a slider and a first linkage;

wherein the track is configured with a fixed component of the center body structure;

wherein the actuator is attached to the slider;

wherein the slider is mated with and is configured to translate along the track; and wherein the first linkage is between and pivotably connected to the slider and the first door.

14. The assembly of claim 13, wherein
the valve further comprises a second door and a second linkage;
the second door is configured to pivot between a closed position and an open position; and
the second linkage is between and pivotably connected to the slider and the second door.

15. An assembly for an aircraft propulsion system, comprising:
a variable area inlet comprising an outer airflow inlet passage, an inner airflow inlet passage, an inlet structure and a center body structure, the outer airflow inlet passage radially between the inlet structure and the center body structure, the inner airflow inlet passage formed within the center body structure, the center body structure comprising a valve configured to regulate air flow through the inner airflow inlet passage, and the valve comprising a first door configured to pivot between a closed position and an open position; and an inlet duct configured to receive air from the outer airflow inlet passage when the first door is in the closed position, and the inlet duct configured to receive air from the outer airflow inlet passage and the inner airflow inlet passage when the first door is in the open position;

wherein the inlet duct is configured to direct air received from the outer airflow inlet passage and the inner airflow inlet passage into a bypass flowpath of the aircraft propulsion system when the first door is in the open position.

16. The assembly of claim 15, wherein the inner airflow inlet passage comprises an annular passage.

17. The assembly of claim 15, wherein the outer airflow inlet passage circumscribes the inner airflow inlet passage.

18. The assembly of claim 15, wherein the inner airflow inlet passage extends within the center body structure from an inlet into the center body structure to an outlet from the center body structure.

19. The assembly of claim 15, wherein the first door is connected to another component of the center body structure by a hinge.

20. The assembly of claim 15, wherein
the first door is configured to pivot about a pivot axis between the closed position and the open position; and
the pivot axis is perpendicular to a centerline of the variable area inlet.

* * * * *